United States Patent [19]

Molleron et al.

[11] 4,168,401
[45] Sep. 18, 1979

[54] DIGITAL SWITCHING UNIT FOR A MULTIRATE TIME-DIVISION MULTIPLEX DIGITAL SWITCHING NETWORK

[75] Inventors: Claude A. Molleron, Fontenay-aux-Roses; Germain G. Brouard, Dourdan, both of France

[73] Assignee: Societe Anonyme de Telecommunications, Paris, France

[21] Appl. No.: 884,360

[22] Filed: Mar. 7, 1978

[30] Foreign Application Priority Data

Apr. 5, 1977 [FR] France .................................. 77 10180

[51] Int. Cl.² ............................................ H04Q 11/04
[52] U.S. Cl. ........................... 179/15 AT; 179/15 AQ; 179/15 BV
[58] Field of Search .......... 179/15 AT, 15 AQ, 15 BV

[56] References Cited

U.S. PATENT DOCUMENTS

| Re. 29,215 | 5/1977 | Carney | 179/15 BV |
|---|---|---|---|
| 3,952,162 | 4/1976 | Texier | 179/15 BV |
| 3,987,251 | 10/1976 | Texier | 179/15 BV |

Primary Examiner—David L. Stewart
Attorney, Agent, or Firm—Abraham A. Saffitz

[57] ABSTRACT

A digital switching unit is used in a multirate time-division multiplex digital switching network, in which first-order digital data channels transmitting words consisting of a given number of bits and having first rates which are different from, but multiple of, one another are given a first multiplexing converting them into the second-order digital data channels having a second predetermined rate. The switching unit comprises at least one buffer store in which the first-order channel words multiplexed into third-order channels are grouped at an address having first and second part, whose first part is the address of the second-order channel containing the first-order channel word in the third-order channel and whose second part is the address of the first-order channel in the second-order channel. The switching unit includes means for supplying from addresses of the words in said second-order channels the first-order channel addresses associated with said word addresses in the second-order channels according to the multiplexing schemes. Supplying means comprises a read-only memory containing for each word group of a second-order channel resulting from a multiplexing of P first order channels according to said multiplexing schemes converting them into a channel analogous to a first-order channel having a rate equal to the highest of said different rates of said first-order channels, a coded word representative of the combination of rates associated with said P first-order channels, and means for decoding each coded word to supply the P first-order channels addresses of each word group associated with a second-order channel to said buffer store.

6 Claims, 2 Drawing Figures

DIGITAL SWITCHING UNIT FOR A MULTIRATE TIME-DIVISION MULTIPLEX DIGITAL SWITCHING NETWORK

CROSS REFERENCES TO RELATED APPLICATIONS

Applicants hereby make cross references to their French Patent Application No. PV 77 10180, filed Apr. 5, 1977 and claim priority thereunder following the provisions of 35 U.S.C. 119.

BACKGROUND OF THE INVENTION

1. Field of the Invention

This invention relates to a digital switching unit for use in a multirate time-division multiplex digital switching network and more particularly, to a network wherein time-multiplexed data derived from time multiplexing of component data having different rates are interleaved with other time-multiplexed data. 2. Description of the Prior Art The time-multiplexed data are trnasmitted to the switching unit via two-way second-order trunks, e.g. at the 64 kbit/s digital rate. These time-multiplexed data arised from time-multiplexing of component data as octets present a multiframe of 80 octets as defined in draft Recommendation X.50 of the International Telephone and Telegraph Consultative Committee. A time multiplexed data transmitting on a line of a trunk at 64 kbit/s can be formed by multiplexing of first-order lines or channels transmitting component data at different low rates of 12.8, 8.4, 3.2 and 0.8 kbit/s, this multiplexing being achieved by recurrent octets.

Each octet of a first-order channel comprises 6 information bits, a bit F reserved for multiplexed framing purposes, i.e. for recovering the rank of the octet in the 80-octet multiframe and a status bit S of the first-order channel to which said octet belongs. Consequently, the binary flow rates of the component low rate data are respectively 12.8, 6.4, 3.2 and 0.8 kbit/s when the binary flow rates for the user are 9.6, 4.8, 2.4 and 0.6 kbit/s, respectively.

The switching network transmits the incoming second-order channels which are given a second time multiplexing converting them into 8 parallel third-order multiplex lines, each having a 1 Mbit/s rate if the switching unit is connected to 128 second-order trunks.

U.S. Pat. No. 3,987,251 likewise describes time-division multiplexing of first-order digital channels converting them into second-order digital channels wherein component data transmitted by first-order channels have different rates. A 80-octet multiframe of a second-order multiplex channel at 64 kbit/s comprises at the same time recurrent octets at a rate one octet repeated every five octets for a 12.8 kbit/s component channel, one octet repeated every twenty octets for a 3.2 kbit/s component channel, or one octet repeated every eighty octets for a 0.8 kbit/s component channel, for example.

In the switching unit of a multirate multiplex digital switching network, each octet of the different second-order channels must be written into a buffer store at an address depending on the address of the first-order component channel in the 80-octet multiframe of the second-order channel. However, in such units the address of the first-order channel does not depend in a simple fashion on the address of the octet in the multiframe transmitted on third-order multiplex. The octet address is associated with the first-order channel adress determined by the multiplexing shemes of said second-order channels.

In this end, in accordance with the U.S. Pat. No. 3,987,251, a read-only memory is used for addressing in writing-in and reading-out the buffer store which receives and transmits the octets. This read-only memory is addressed by the whole addresses of the octets, i.e. by fourteen-bits addresses for 128 second-order channels, and provides at its output the addresses of the first-order component channels. According to this U.S. Patent, an octet address consists of two parts. A first address part determines the octet rank in the third-order multiframe or the address of the corresponding second-order channel and comprises seven bits as there are 128 second-order channels. The second address part defines the time-slot allocated to the octet of the 80-octet multiframe corresponding to said second-order channel and may include up to seven bits. In fact, the number of bits necessary to write such a second address part depends on the number of time-slots in the multiframe and requires 3, 5 or 7 bits if the 64 kbit/s second-order channel is derived from time-division multiplexing of 5, 20 or 80 component first-order channels. Such a switching unit therefore requires a read-only memory capable of storing the addresses of all the octets of each second-order multiframe. Thus such a switching unit adapted to treat 128 second-order channels or trunk lines requires the storage of $128 \times 80 \times 7 = 71\,680$ bits.

OBJECT OF THE INVENTION

The principal object of this invention is precisely to deduce the address of a first-order channel ipso facto from the address of the corresponding octets in the multiframe of a second-order channel, this being contrary to the prior art.

SUMMARY OF THE INVENTION

According to the invention, a digital switching unit for using in a multirate time-division multiplex digital switching network comprises at least one buffer store in which the first-order channel words multiplexed into the third-order channels are grouped at a resultant address having first and second part, whose first part is the address of the second-order channel containing the first-order channel word in the third-order channel and whose second part is the address of the first-order channel in the second-order channel, means for inserting in each of the words of an outgoing second-order channel bits forming a pseudorandom sequence having a known period so that the bits of a given rank of the words of a third-order outgoing channel form a number of interleaved pseudorandom sequences, means for separating said pseudorandom sequences contained in the words of said incoming second-oder channels and for deriving therefrom the addresses of the words in the said second-order channels, and means for supplying from said addresses of the words in said second-order channels the first-order channel addresses associated with said word addresses in the second-order channels according to said multiplexing schemes, said supplying means comprising:

a read-only memory containing for each word group of a second-order channel resulting from a multiplexing of P first-order channels according to said multiplexing schemes converting them into a channel analogous to a first-order channel having a rate equal to the highest of said different rates of said first-order channels, a coded word representative of the combination of rates associated with said P first-order channels; and means for decoding each coded word to supply the P first-order channel addresses of each word group associated with a second-order channel to said buffer store.

Such a switching unit comprises a first-order channel address computer of small dimensions and of low cost. If the switching network transmits 128 incoming second-order channels at 64 kbit/s rate, each forming five groups of first-order channels at different low rates equivalent to five 12.8 kbit/s multiplex channels, the read-only memory in the first-order channel address computer embodying the invention contains $128 \times 5 \times 2$, i.e. 1280 bits in place of the 71 680 bits of the prior art.

BRIEF DESCRIPTION OF THE DRAWING

Further objects and advantages of the present invention will be apparent from a reading of the following description in conjunction with the accompanying drawings wherein.

DESCRIPTION OF THE PREFERRED EMBODIMENT

Figure 1:
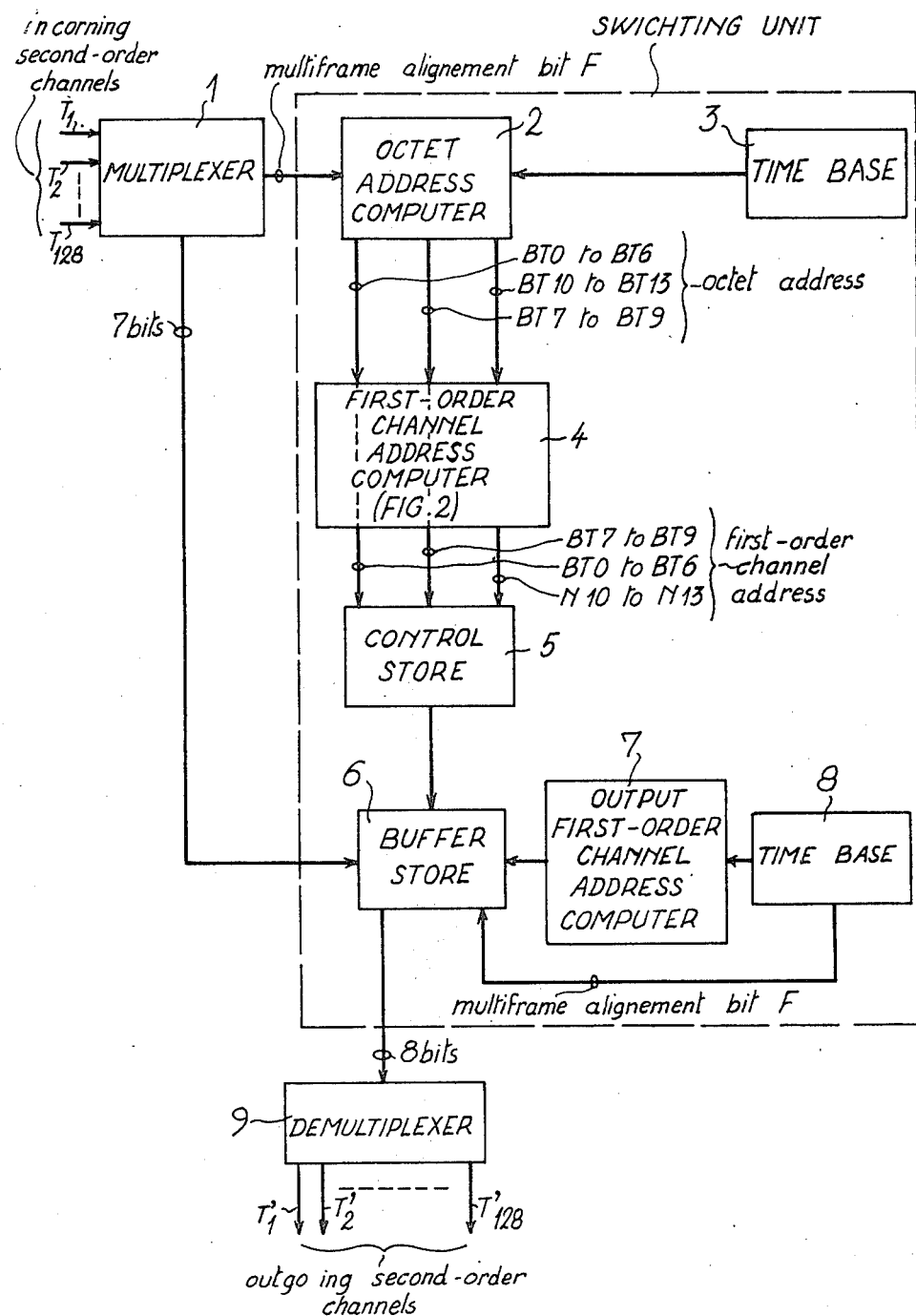
FIG. 1 is a view in block form of the digital switching unit embodying the invention provided with its input and output first-order channel address computers.

Referring to FIG. 1, there can be seen 128 two-way 64 kbit/s time-division multiplex trunks, the incoming lines or channels $T_1$ through $T_{128}$ of which are connected to a multiplexer 1 and the outgoing lines or channels $T_1'$ through $T_{128}'$ of which are connected to a demultiplexer 9. The multiplexer 1 and demultiplexer 9 are interconnected to the digital switching unit of the multirate time-division multiplex digital switching network embodying the invention.

In an analogous manner to the switching network described in the U.S. Pat. No. 3,987,251, each two-path trunk is composed of channels of known type which send and receive multiplexed data at 64 kbit/s binary rate in the form of octets allocated to the monorate first-order channels. Each incoming second-order channel arises from multirate multiplexing of component first-order channels or lines which have, in the present case, binary rates equal to 12.8, 6.4, 3.2 and 0.8 kbit/s. The multiplexing of first-order channels into a second-order channels is effected according to a structure of "first-order data channel groups".

The term "group" is hereinafter used to mean a 16-octet group or a 16-time-slot group equivalent to a first-order channel having the higher rate equal to 12.8 kbit/s, the octets of which being allocated to regularly spaced time-slots in the 80-octet multiframe of the second-order channel. A group is generally composed of octets belonging to multiplexed first-order channels having different rates. Indeed, if one divides the 80-octet multiframe into five first-order channels at 12.8 kbit/s rate, i.e. into five groups, each 12.8 kbit/s channel or group then forms a group of 16 time-slots, each allocated to an octet regularly spaced in the 80-octet multiframe.

The 80 time-slots being numbered from 0 to 79, the groups are composed of the following time-slots:

| decimal group number | Binary coded group number | Decimal time-slot number in a 80-octet multiframe |
|---|---|---|
| 0 | 0 0 0 | 0-5-10-15-..... 75 |
| 1 | 0 0 1 | 1-6-11-16-..... 76 |
| 2 | 0 1 0 | 2-7-12-17-..... 77 |
| 3 | 0 1 1 | 3-8-13-18-..... 78 |
| 4 | 1 0 0 | 4-9-14-19-..... 79 |

The numbering of the time-slots, according to the invention, consists in attributing an address (hereinafter called second octet address part) comprising 7 bits. The group number (0 to 4) to which belongs a time-slot, is encoded into its binary equivalent constituted by the three low weight bits of said address, and the time-slot rank or the octet rank in the group which is between 0 and 15, is encoded into its binary equivalent constituted by the four high bits of said address.

The general representation of the second octet address part in the 80-octet multiframe is identified by the following word:

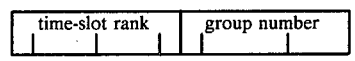

The following table will specify the binary coded numbering address of time-slots.

| decimal time-slot number | Second octet address part | |
|---|---|---|
| | time-slot rank | group number |
| 0 | 0 0 0 0 | 0 0 0 |
| 3 | 0 0 0 0 | 0 1 1 |
| 4 | 0 0 0 0 | 1 0 0 |
| 5 | 0 0 0 1 | 0 0 0 |
| 13 | 0 0 1 0 | 0 1 1 |
| 19 | 0 0 1 1 | 1 0 0 |
| 52 | 1 0 1 0 | 0 1 0 |
| 79 | 1 1 1 1 | 1 0 0 |

In a same 16-octet group, one or several first-order channels at low rate can be inserted per multiframe; whether one single 12.8 kbit/s rate channel (P=1), or two 6.4 kbit/s rate channels (P=2), or four 3.2 kbit/s rate channels (P=4), or sixteen 0.8 kbit/s rate channels (P=16). One could again insert on a common group first-order channels having different rates without changing the principle of the addressing. Thus the number of monorate first-order channels, the multirate digital switching network can deal with, it at least $5 \times 128 = 640$ if they are all at 12.8 kbit/s rate and $20 \times 128 = 2560$ if they are all at 3.2 kbit/s rate or even $80 \times 128 = 10\ 240$ if they are all at 0.8 kbit/s rate.

It will be understood that a first-order channel address (i.e. second address part) is deduced ipso facto from the corresponding octet address (i.e. second address part) in the 80-octet multiframe. Assuming that the multiplexing scheme of first-order channels corresponds to a digital second-order multiplex channel associated with the incoming line $T_m$, where m is between 0 and 127. A first part of the octet address is formed of the binary coded word with 7 bits and represents the number m of the corresponding second-order channel in the third-order multiframe of 128 time-slots. The second part of the octet address represents the address of the corresponding first-order channel in the 80-octet multiframe of the corresponding second-order channel.

As stated, the second address part is composed of binary coded group number (3 bits) and of the binary coded octet rank in the 16-octet group (4 bits). If n denotes the octet or time-slot decimal number of the corresponding first-order channel (between 0 and 79) in the 80-octet multiframe, the number of the corresponding group is the binary encoded remainder of the division n/5 which is between 0 and 4. The number of the time-slot or first-order channel in the group is the quotient encoded into binary of the division n/5 which is between 0 and 15.

All the incoming data transmitted on the lines $T_1$ through $T_{128}$ are time multiplexed by means of the multiplexer 1 shown in the FIG. 1, which converts them into parallel 8-bit words or octets with the cyclic rate of 1.024 megaoctet per second. A time base 3 in the digital switching unit receives a reference clock frequency at 2.048 MHz and provides all the signals of timing and addressing necessary to the digital switching unit. The timing signals thus deduced at 1.024 MHz, 64 kHz and 8 kHz are respectively the signal of second-order channel multiplexing, the bit clock signal and the octet clock signal for the second-order channels.

An octet address computer 2 extracts from parallel octets transmitting from the multiplexer 1 the multiframe alignment bit F, which is well-known in the art. This bit F is produced by pseudorandom framing sequence generators, not shown in the FIG. 1, usually located in monorate switching networks as described in the U.S. Pat. No. 3,952,162. The octet address computer 2 receives the bit F of the incoming second-order channels treated by the multiplexer 1 and also the address of three channels. This octet address computer comprises a sequential access memory for storing 128 words of each 13 bits, a register of 13 bits, two read-only memories, one having a capacity of 128 words of each 7 bits and the other having a capacity of 256 words of each 7 bits and a counter having a maximal count 128. The counter gives the number of the incoming second-order channel. The sequential access memory stores for each second-order channel the 7 last multiframe alignment bits F for example 7 bits plus 6 other bits of diverse functions: presynchronization, synchronization, counting of errors, decoding of the first time-slot of the multiframe, etc.

We shall use the term "number of the first-order channel" to refer to the number of the first time-slot allocated to first-order channel in the corresponding second-order multiplex channel or, more precisely, in the associated group of 80-octet multiframe of this second-order channel. As shown in FIG. 1, a first-order channel address computer 4 receives from the octet address computer 2 the numbers of the second-order channel, of the group and of the time-slot for each incoming octet. This computer 4 comprises a read-only memory of 1024 words of each 2 bits $B_1$ and $B_2$, which is controlled in writing-in by the control unit of the digital switching unit, not shown in the FIGS. 1 and 2. These two bits $B_1$, $B_2$ indicate if the group considered relates to a single first-order channel at 12.8 kbit/s rate or 4 first-order channels at 3.2 kbit/s, for example.

The four possible rates, namely equal to 12.8, 6.4, 3.2 and 0.8 kbit/s, can be identified by a binary encode. Thus for each of the 128 incoming second-order channels, the first-order channel address computer 4 disposes of five addresses corresponding to the five groups of a 80-octet multiframe or, as already mentioned, to five 12.8 kbit/s first-order channels. Each address contains a binary 2-bit word $B_1B_2$ which indicates if the group transmits the component data of:

1 first-order channel at 12.8 kbit/s rate: $B_1=0$ $B_2=0$
2 first order channels at 6.4 kbit/s rate: $B_1=1$ $B_2=0$
4 first-order channels at 3.2 kbit/s rate: $B_1=1$ $B_2=1$
16 first-order channels at 0.8 kbit/s rate: $B_1=0$ $B_2=1$ An octet address is defined by 14 bits BT 0 through BT 13 delivered from the octet address computer 2. The bits BT 0 through BT 6 identify one of the 128 second-order channels, the bits BT 7 through BT 9 identify the binary coded number of the group out-of-five per 80-octet multiframe and the bits BT 10 through BT 13 identify the rank of the time-slot or octet in the considered group.

Figure 2:
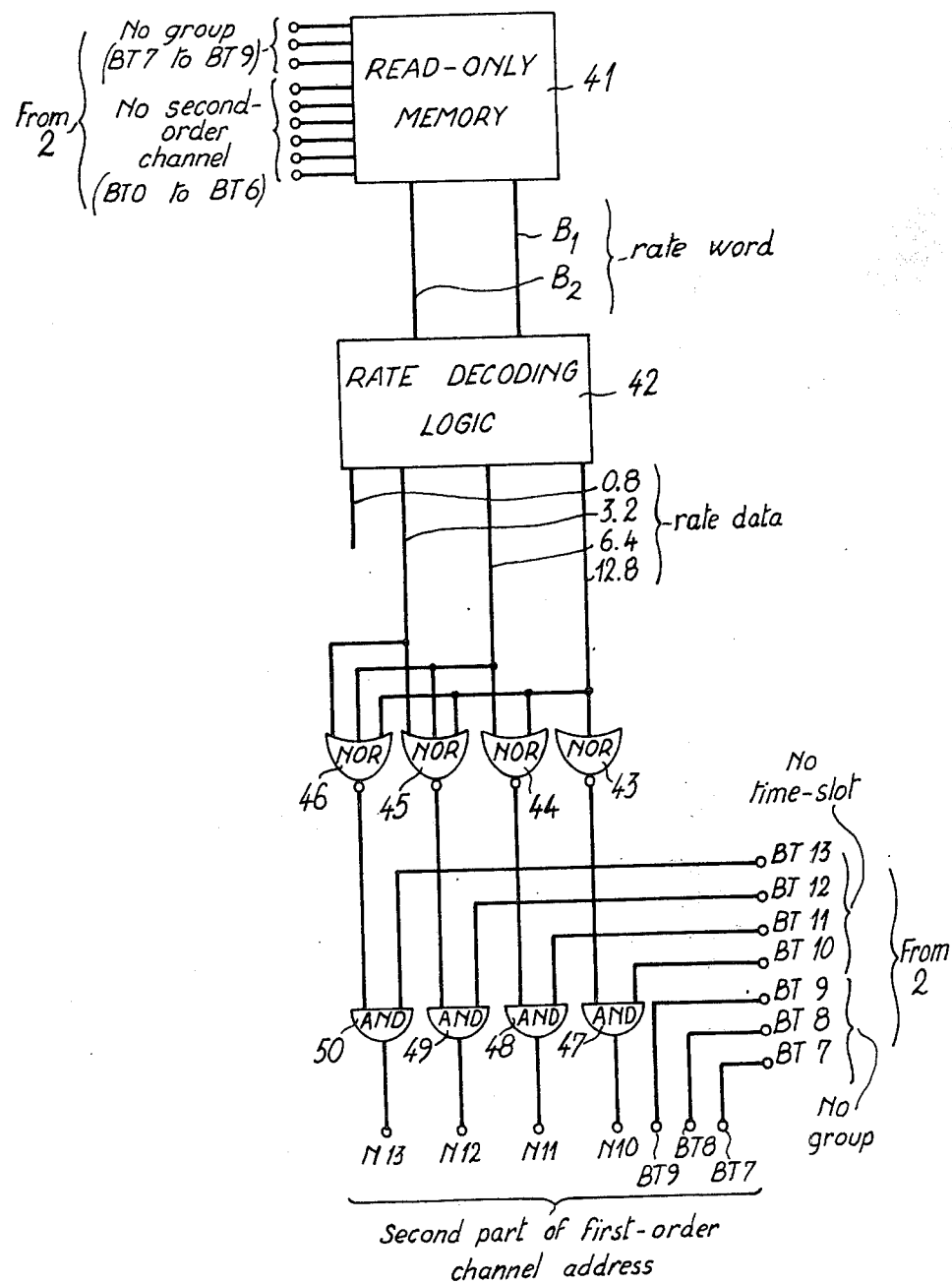
FIG. 2 is a detailed block schematic diagram of the input first-order channel address computer adapted to produce the addresses of component first-order channels having rates equal to 12.8 kbit/s, 6.4 kbit/s, 3.2 kbit/s and 0.8 kbit/s.

Referring now to FIG. 2, there is shown a more detailed diagramme of the first-order channel address computer 4. It comprises a read-only memory 41 containing 1024 words $B_1B_2$ representing the multiplexing identification of the five groups of each of the 128 incoming second-order channels in accordance with the multiplexing shemes. This memory 41 supplies to a decoding logic 42 the words $B_1B_2$ indicating the corresponding low rate combination chosen from 12.8, 6.4, 3.2 and 0.8 kbit/s low rates. Four NOR-gates 43 through 46, respectively connected to outputs of logic 42, supply by means of their output state, the informations permitting truncation of the 4, 3, 2 (or none) high weight bits of the binary-coded number BT 10-BT 13 of the incoming time-slot transmitted from the octet address computer 2. The rank of the time-slot BT 10 through BT 13 is combined with the information issuing from the NOR-gates 43 through 46 in four AND-gates 47 through 50 to provide the number of the incoming first-order channel. This binary encoded number is composed of the four bits N10 through N13. Therefore, the second part of a first-order channel address consists of this number N10 through N13 and the group number BT7 through BT9 transmitted from the computer 2.

The following table gives explicitly the complete address of each first-order channel obtained at the output of the computer 4 in the case where the "group" associated 1, 2, 4 or 16 first-order channels having the same binary rate equal to 12.8, 6.4, 3.2 or 0.8 kbit/s.

| Group | | First-order channel address | | | | | | | |
|---|---|---|---|---|---|---|---|---|---|
| rate (kbit/s) | $B_1$ $B_2$ | First-Order channel number | | | | Group number | | | Second-order channel number |
| 12.8 | 0  0 | 0 | 0 | 0 | 0 | BT9 | BT8 | BT7 | BT6 – BT0 |
| 6.4  | 0  1 | 0 | 0 | 0 | BT10 | BT9 | BT8 | BT7 | BT6 – BT0 |
| 3.2  | 1  1 | 0 | 0 | BT11 | BT10 | BT9 | BT8 | BT7 | BT6 – BT0 |
| 0.8  | 1  0 | BT13 | BT12 | BT11 | BT10 | BT9 | BT8 | BT7 | BT6 – BT0 |

According to another embodiment, the low rate at 0.8 kbit/s is abandoned and the monorate first-order channels in a common group can have different binary rates. For instance, in a multirate group, which associates P=3 first-order channels, namely a first-order channel at 6.4 kbit/s rate and two first-order channels at 3.2 kbit/s rate, the 6.4 kbit/s channel is identified by a binary coded number such as BT10=0 and the two 3.2 kbit/s channels are identified by a binary coded number such as BT10=1. The following table specified the first-order channel adresses in accordance with this example:

| rate (kbit/s) | First-order channel address | | | | | |
|---|---|---|---|---|---|---|
| | First-order channel number | Group number | | | Second-order channel number | |
| 6.4 | 0 | 0 | BT9 | BT8 | BT7 | BT6 – BT0 |
| 3.2 | BT11 | 1 | BT9 | BT8 | BT7 | BT6 – BT0 |

During a reference clock half-period, the octet address word of 14 bits which is supplied from the computer 2, is reading-out. The two read-only memories of this computer 2 provide the time-slot number for the computer 4 which itself supplies the address of the first-order channel to which this time-slot belongs.

Thus the first-order channel address computer 4 receives the incoming octet address (first and second address parts) coming from the octet address computer 2 and supplies the incoming first-order channel address for addressing in writing of a control store 5. The readingout of the computer 4 is achieved during a reference clock half-period and during the other half-period the control unit, not shown in the figures, controls the writing-out of the computer 4.

Thus, the control store 5 received from the input computer 4 the first-order channel address. It stores thus for each octet the binary second-order channel number or first address part BT0 through BT6) and the group number (BT7 through BT9) and the first-order channel number (BT10 through BT13) or the second address part which compose the whole address of each first-order channel. This control store 5 provides the address of the correspondent where it is necessary to write-in the incoming octet into a buffer store 6.

Indeed, the buffer store 6 receives the multiplexed component data from the incoming trunk lines which are multiplexed by the multiplexer 1. The buffer store 6 stores an octet for each firstorder channel. In fact, it receives 7 bits instead of 8 bits (one status bit plus six information bits) from the multiplexer 1 since the multiframe alignment bits F according to the multiframing sequence are produced by a time base 8. The store 6 write this octet at the address of the correspondent provided by the control store 5.

The digital switching unit embodying the invention also comprises an output first-order channel address computer 7 which addresses this buffer store 6 in reading-out. The computer 7 is similar to the input computer 4 and supplies, for each data octet contained in the buffer store 7, the address of the outgoing first-order channel to which it is allocated, at timing of a time base 8. As stated, the time base 8 produces the multiframe alignment bit F for all the outgoing second-order channels. This bit is computed from a generator of pseudorandom multiframing sequence of 127 bits which is shortened or abbreviated from 127 to 80 bits by an approximation process as described in U.S. Pat. No. 3,952,162. It would be possible to use only a single first-order channel address computer for the switching unit embodying the invention; however, for reasons of organisation not set out in the present invention, it is desirable to insert in output a second computer 7 similar to the first 4.

The demultiplexing of the outgoing component data from the buffer store 6 is performed in the demultiplexer 9 to form the 128 outgoing second-order multiplex channels or trunk lines $T_1'$ through $T_{128}'$.

Such a switching unit, adapted to be connected to 128 two-path trunks, permits octet addresses to be expressed by a number of bits equal to 14 (first and second parts of the address), which number is independent of the rates of the first-order channels and to deduce the first-order channel address ipso facto from the octet address in the 80-octet multiframe. This results, technologically, first-order channel address computers which are of much lower cost and size, the second address part of a first-order channel being no longer contained in its entirety in the read-only memory of the input first-order channel address computer as described in the U.S. Pat. No. 3,987,251. Instead of the stored seven bits giving the number of the first-order channel in the 80-octet multiframe, a computer 4 embodying the invention contains two bits $B_1$ and $B_2$ per multiplexed first-order channel group corresponding to a first-order channel at 12.8 kbit/s.

It would also be possible, without changing the operation of the switching unit embodying the invention, the utilise digital first-order channels having the four rates 12.8 kbit/s, 6.4 kbit/s, 3.2 kbit/s and 0.8 kbit/s, multiplexed in digital second-order channels at 64 kbit/s rate in which binary rates of 6.4 kbit/s, 3.2 kbit/s and 0.8 kbit/s would be interleaved. It would then be appropriate to utilise a first-order channel address computer containing a read-only memory 41 storing a 3- or 4-bit rate data word for each 16-octet group out of five of a 80-octet multiframe.

What we claim is:

1. A digital switching unit for use in a multirate time-division multiplex digital switching network, in which first-order digital data channels transmitting words consisting of a given number of bits and having first rates which are different from, but multiple of, one another are given a first multiplexing converting them into second-order digital data channels having a second predetermined rate, in which each said second-order channels each containing first-order channels of at least two different rates in accordance with multiplexing schemes which can differ for each second-order multiplex channel, and in which said second-order digital channels are given a second multiplexing converting them into third-order digital data channels having a third predetermined rate; said digital switching unit comprising:

at least one buffer store in which the first-order channel words multiplexed into the third-order channels are grouped at a resultant address having fist and second part, whose first part is the address of the second-order channel containing the first-order channel word in the third-order channel and whose second part is the address of the first-order channel in the second order channel;

means for inserting in each of the words of an an outgoing second-order channel bits forming a pseudorandom sequence having a known period so that the bits of a given rank of the words of a third-order outgoing channel form a number of interleaved pseudorandom sequences;

means for separating said pseudorandom sequences contained in the words or said incoming second-order channels and for deriving therefrom the addresses of the words in said second-order channels;

means for supplying from said addresses of the words in said second-order channels the first-order channel addresses associated with said word addresses in the second-order channels according to said multiplexing schemes, said supplying means comprising:

a read-only memory containing for each first order channel word group a second-order channel which results from a multiplexing of P first-order channels according to said multiplexing schemes into a channel analogous to a first-order channel having a rate equal to the highest of said different rates of said first-order channels, a coded word representative of the combination of rates associated with said P first-order channels; and means for decoding each coded word to supply the P first-order channels addresses of each word group associated with a second-order channel to said buffer store.

2. A digital switching unit for use in a multirate time-division multiplex digital switching network according to claim 1, in which the second address part of a first-order channel consists of the binary coded number of the associated group in the second-order channel and the binary coded number of said first-order channel in said associated group.

3. A digital switching unit for use in a multirirate time-division multiplex digital switching network according to claim 2, in which the number P of said first-order channels belonging to a group of 16 words is equal to 1, 2, 4 or 16 when said first-order channels of said group have the same binary rate equal to 12.8 kbit/s, 6.4 kbit/s, 3.2 kbit/s or 0.8 kbit/s.

4. A digital switching unit for use in a multirate timedivision multiplex digital switching network according to claim 2, in which the number P of said first-order channels belonging to a word group is at most equal to 4 when said first-order channels of said group are two to have a binary rate equal to 3.2 kbit/s and one to have a binary rate equal to 6.4 kbit/s or when said first-order channels of said group have the same binary rate equal to 12.8 kbit/s, 6.4 kbit/s or 3.2 kbit/s.

5. A digital switching unit for use in a multirate time-division multiplex digital switching network according to claim 3 or 4, in which each coded word contained in said read-only memory has at most two bits.

6. A digital switching unit for use in a multirate time-division multiplex digital switching network according to claim 5, in which said decoding means deduces from each coded word representative of the rates combination associated with P first-order channels of a group the binary coded number of each first-order channel of said group by setting to zero respectively the 4, 3, 2 and 0 high weight bits of the binary coded ranks of words of said first-order channel in the associated second-order channel multiframe, said binary coded rank being contained in the address of said associated first-order channel word and supplying from said separating and deriving means.

* * * * *